United States Patent [19]
Fritz, Jr.

[11] Patent Number: 5,732,930
[45] Date of Patent: Mar. 31, 1998

[54] VALVE HAVING TEE SLOT ATTACHMENTS IN SERVICE AREA

[75] Inventor: Richard E. Fritz, Jr., Magnolia, Tex.

[73] Assignee: Zimmermann & Jansen, Inc., Humble, Tex.

[21] Appl. No.: 674,500

[22] Filed: Jul. 2, 1996

[51] Int. Cl.⁶ .................................................. F16K 3/00
[52] U.S. Cl. ........................... 251/328; 251/326; 251/360
[58] Field of Search ................................. 251/326, 328, 251/360, 306, 316

[56] References Cited

U.S. PATENT DOCUMENTS

| | | |
|---|---|---|
| 3,726,306 | 4/1973 | Purvis . |
| 3,964,507 | 6/1976 | Jandrasi et al. . |
| 4,316,483 | 2/1982 | Jandrasi . |
| 4,881,719 | 11/1989 | Bowman ........................ 251/326 |
| 5,082,247 | 1/1992 | Owens ........................... 251/326 |
| 5,137,261 | 8/1992 | Clifford ......................... 251/328 |
| 5,150,881 | 9/1992 | McKavanagh .................. 251/328 |
| 5,234,196 | 8/1993 | Harris ............................ 251/328 |
| 5,295,661 | 3/1994 | Roussel ......................... 251/326 |
| 5,366,199 | 11/1994 | Isoyama ......................... 251/328 |

*Primary Examiner*—Denise L. Ferensic
*Assistant Examiner*—Ramyar Farid
*Attorney, Agent, or Firm*—Pravel, Hewitt, Kimball & Krieger

[57] ABSTRACT

A valve has removable internal components including a disc, an orifice plate, and guides for engaging and guiding the disc. The internal components are removably secured to a valve seat plate by tee bolts. The seat plate is drilled, bored, or machined to include a plurality of cavities. Each cavity has a cantilevered projection extending over avoid in the cavity, and a slot is formed in each projection to form a tee slot for receiving the tee bolt. Each tee bolt has a head which is slipped into the void in the cavity so that the head engages the cantilevered projection while a shank of the tee bolt extends outward through the slot. The orifice plate has bolt holes for receiving the tee bolts, and an opening in the orifice plate is aligned with a passageway through the valve. A nut is tightened onto the shank of each tee bolt. After extended service, the tee bolts are still easily removable and replaceable, and the tee bolts can be aligned with bolt holes in a replacement orifice plate.

9 Claims, 6 Drawing Sheets

VALVE HAVING TEE SLOT ATTACHMENTS IN SERVICE AREA

SPECIFICATION

BACKGROUND OF THE INVENTION

1. Field of the Invention

This invention relates to a valve and in particular to a valve having removable internal components.

2. Description of the Prior Art

Valves are used in various fluid flow applications in many industries including petroleum refining, petrochemical production, steel, and electrical power generation. Internal valve components wear over their service life and need to be replaced. In many applications it is preferable to remove worn components from a valve body while leaving the valve body installed.

In the past a valve seat in a valve body has been typically drilled and tapped for bolt-on attachment of internal removable components. Problems arose when an attempt was made to remove the bolts to replace the internal components after the valve had been in service for a period of time. Bolts used for this type of attachment frequently seized and sheared off, particularly if the service was a high-temperature service. When a bolt sheared off, the bolt had to be drilled out of the tapped hole, and the hole had to be retapped. These valves have been typically used in large plants and factories, and there was a very high cost associated with equipment downtime due to lost production. These valves are typically large and not easily accessible. Drilling out broken bolts and retapping holes was time consuming and consequently, very expensive.

Other problems have been experienced when replacing internal components during a downtime. Frequently, bolt holes in replacement internal components did not align properly with bolt holes in the valve seat. This may have been due to retapping a hole improperly so that a bolt did not project perpendicular from a face surface of the valve seat. Another cause of misalignment has been that the bolt holes drilled in the replacement component were not in the precise location required for alignment with the bolt holes in the valve seat. In any case the nature of the misalignment had to be identified, and then frequently the replacement component had to be sent to a shop for reworking. This caused unnecessary downtime for the plant or factory at great expense in lost production.

Also, there has been a problem with the prior art valves experienced during service. In high-temperature service, the valve body and the internal components expand when heated. A bolt in a drilled and tapped hole is fixed and cannot move to accommodate thermal expansion. Consequently, thermal expansion often caused a shear force on the bolts, sometimes breaking the bolts. This shortened the service life of the valve and required premature replacement of the internal components, again at great expense.

U.S. Pat. No. 3,726,306 discloses a control valve having a slide or disc for particular use in fluid catalytic cracking units. Such units operate at high temperatures with high-velocity, abrasive materials. The control valve has a valve body and a valve assembly that includes an inlet liner, port guides, and a slide. The valve assembly is removable as a unit from the valve body for repair or replacement, so that the valve body need not be disconnected and removed from the refinery unit for maintenance. However, the valve had a seat plate which was drilled and tapped for receiving bolts. The valve was thus subject to the problems described above.

U.S. Pat. No. 3,964,507 discloses a slide valve with integrated removable internal components for operating in a high pressure, high temperature, erosive flow environment. The slide valve included a body having a flow passage through it including an enlarged internal portion, a body portion projecting into the enlarged internal portion, and a cone. A valve surface or orifice plate was releasably secured on the projecting body portion, and a slide valve was slideable in the enlarged internal portion adjacent the valve surface. Transversely spaced guides were disposed in the enlarged internal portion. However, the guides were bolted into drilled and tapped holes and were thus subject to the problems described above.

SUMMARY OF THE INVENTION

Briefly, the present invention provides a new and improved valve with components providing for attaching removable internal components to a seat plate within the valve. The present invention provides a valve having removable internal components. The valve includes a valve body having a passageway for flow therethrough and a valve seat in the valve body proximate to the passageway. The valve seat has a cavity and a slot thereabove for receiving a bolt head, and an internal component is removably secured to the valve seat. In a preferred embodiment the internal component includes an orifice plate. Preferably, the internal component further includes guides and a disc slideably engaged with the guides. In a preferred embodiment a shoulder or projection extends out or is cantilevered over the cavity and the slot is formed therein. Preferably, a plurality of cavities, each with a slot thereabove, are included.

In another aspect the present invention provides a valve including a valve body having a passageway for flow therethrough, a seat plate around the perimeter of the passageway, the seat plate having a face transverse to the passageway and a plurality of cavities formed in the face, and a plurality of projections, each extending from the face over a respective cavity, wherein each projection has a slot.

Each cavity thus has an associated slot, the cavity and slot being referred to as a tee slot. A tee slot is used instead of a drilled and tapped hole. The tee slot receives and holds a head of a bolt, a tee bolt. The head of the tee bolt is slipped into the tee slot, the head fitting into an opening or space behind or underneath a slotted projection cantilevered over the cavity. The tee bolt has a threaded shank which extends from the valve seat. The orifice plate is bolted to the seat plate by engaging a nut onto each threaded shank of each tee bolt, one for each tee slot.

The present invention is advantageous for several reasons. The problem of a bolt seizing and fusing into its bolt hole is solved because the present invention eliminates drilled and tapped holes. When a bolt was sheared off in the prior art valves described above, the bolt typically had to be drilled out and the hole had to be retapped. When a bolt is sheared off in the present invention, the bolt head can be easily slipped out of the tee slot, and a replacement tee bolt can be slipped into the tee slot. Secondly, the tee bolts can be aligned with bolt holes in the orifice plate, even if the bolt holes are not in exactly correct position because the tee bolts can be moved slightly. This solves the misalignment problem described above. Further, thermal expansion is accommodated because the tee bolts can slide slightly within the tee slots.

The more important features of this invention have been summarized rather broadly in order that the detailed description may be better understood. There are, of course, additional features of the invention which will be described hereafter and which will also form the subject of the claims appended hereto.

BRIEF DESCRIPTION OF THE DRAWINGS

In order to more fully describe the drawings used in the detailed description of the present invention, a brief description of each drawing is provided.

DETAILED DESCRIPTION OF PREFERRED EMBODIMENT

Figure 1:
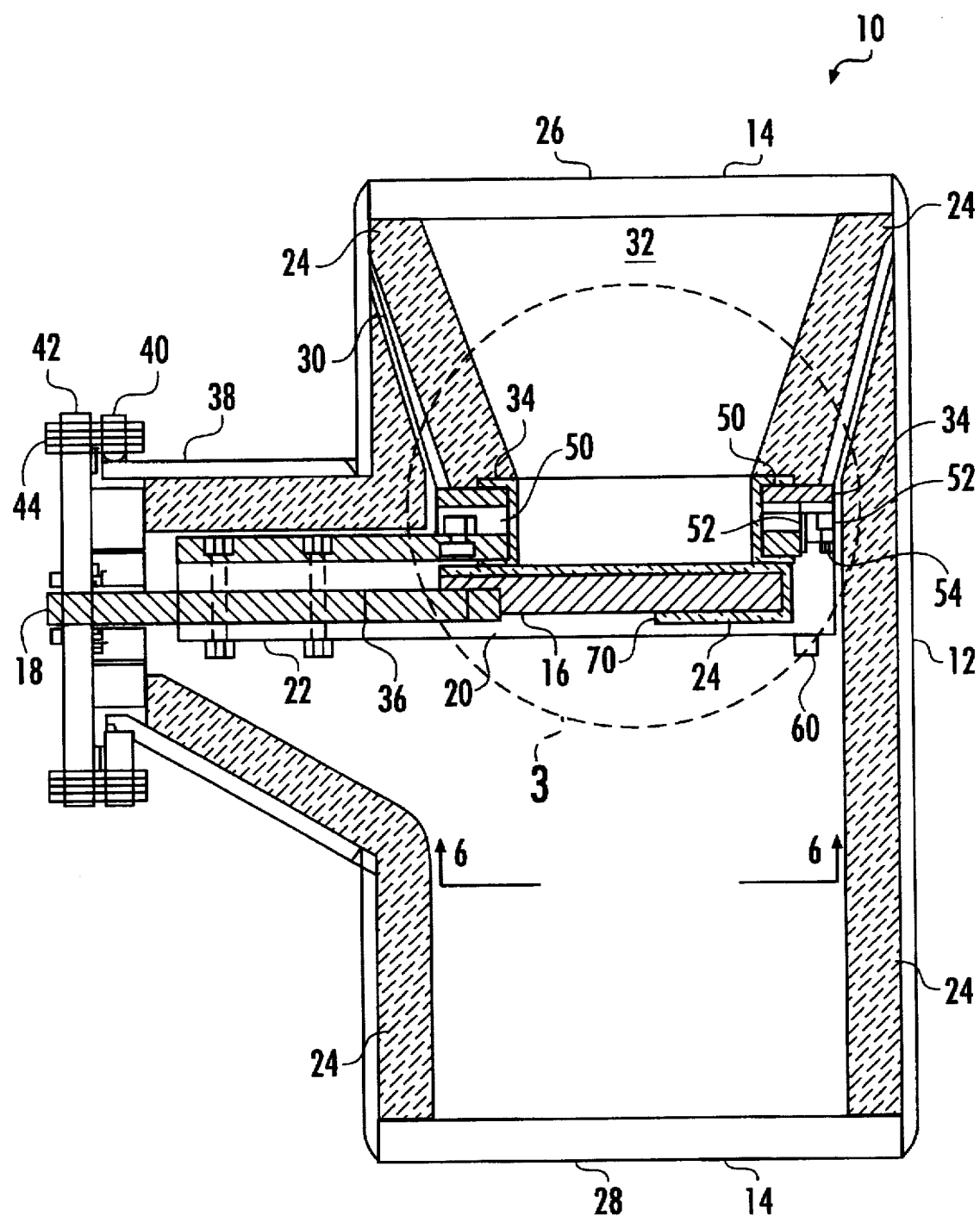
FIG. 1 is an elevation view, taken partly in cross section of a valve according to the present invention.

With reference to FIG. 1, a valve 10 according to the present invention is shown in cross section. The valve 10 has a valve body 12 and a passageway 14 for flow through the valve body 12. A disc 16 opens or closes the passageway 14. The disc 16 is shown in its closed position. A valve stem 18 is attached to the disc 16 at an attachment point 20. An actuator or other suitable means connects to the valve stem 18 to move the valve stem 18 axially. The actuator pulls the valve stem 18 along its longitudinal axis transversely opening the passageway 14 for fluid flow out of the valve body 12. The actuator also pushes the valve stem 18 in a reverse direction along its longitudinal axis transversely into the valve body 12, moving the disc 16 into a closed position and blocking fluid flow through the valve 10. The actuator can also be used to move stem 18 to intermediate positions, with the disc 16 in selected intermediate positions to throttle or regulate flow through the passageway 14.

Guides 22 within the valve body 12 guide the disc 16 and retain it in a desired position set by the actuator and valve stem 18. The guides 22 allow the disc 16 to slide transversely within the valve body 12, but yet allow the disc 16 to resist the forces exerted upon it by material flowing in the passageway 14.

In a preferred embodiment the valve 10 is used for high-temperature service, meaning at temperatures of several hundred degrees Fahrenheit or more. For heat protection, internal surfaces of the valve 10 are typically coated with a refractory material 24. Refractory hex steel may be welded to the internal surfaces of the valve 10 to help to bond the refractory material 24 to the internal surfaces. The refractory material 24 may be, for example, applied as a viscous fluid to the internal surfaces and allowed to set or harden. The refractory material 24 insulates the valve 10 from high-temperature fluid or fluidized material flowing through the passageway 14 and inhibits erosion of the internal surfaces. The disc 16 may also be similarly protected by refractory material 24 on surfaces which are exposed to fluid in the passageway 14.

Fluid or a fluidized material in the facility or plant where valve 10 is in use enters the passageway 14 at an entrance 26 and flows out of the passageway 14 at an exit 28. An internal support cone 30, typically coated with refractory material 24, defines an entrance chamber 32 into the valve 10. In this preferred embodiment a valve seat plate 34 is secured to the support cone 30, typically by welding. However, it should be understood that the seat plate 34 can be integral with or mounted directly to the valve body 12 and that the support cone 30 need not be included in the valve 10 in all situations.

Figure 2:
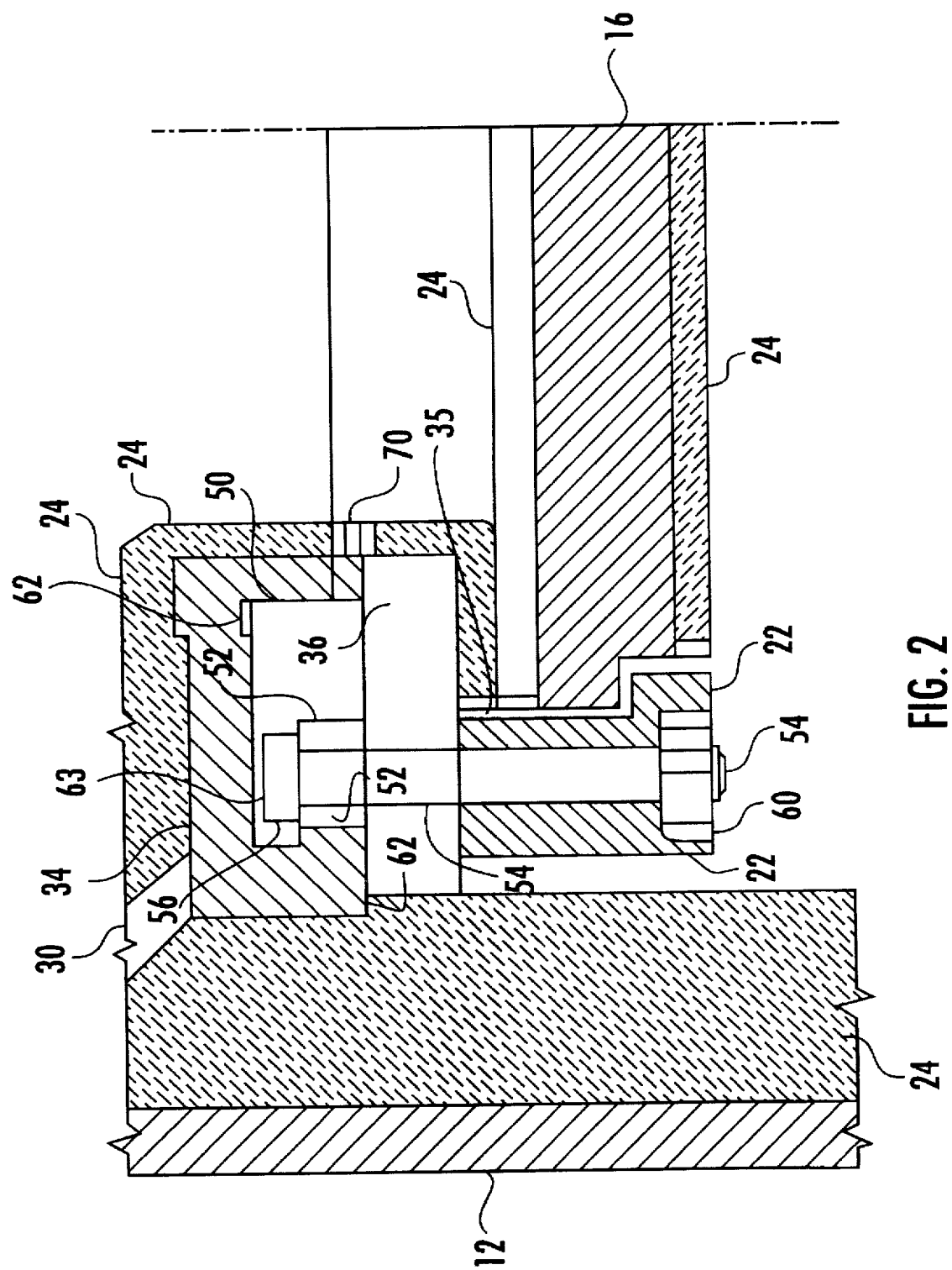
FIG. 2 is a cross-sectional view of the valve of FIG. 1 taken to show portions of the structure of the present invention.

An orifice plate 36 (FIGS. 1 & 2) is bolted to the seat plate 34, and the guides 22 are attached to the orifice plate 36 and thereby to the seat plate 34. The guides 22 and the orifice plate 36 form a channel 35, which retains the disc 16 in position. The guides 22 are shown as an L-shape in cross section, but other shapes in cross section are suitable, such as a U-shape.

During service, internal components 37 of the valve 10, which include the disc 16, the stem 18, the guides 22, and the orifice plate 36 tend to erode and wear. Consequently, the internal components 37 are removable so that the internal components 37 can be replaced as a maintenance procedure. Access is provided for removal of the internal components 37. The valve 10 has a valve bonnet 38 fitted with a bonnet flange 40. A bonnet cover flange 42 is removably secured to the bonnet flange 40 by flange bolts 44. The bonnet cover flange 42 is removed by removing the flange bolts 44 while the valve 10 is out of service. With the bonnet cover flange 42 removed, one has access to disassemble and remove the internal components 37.

In a prior art valve a seat plate, such as seat plate 34, typically had drilled and tapped holes, and bolts were threaded into these holes to attach an orifice plate to the seat plate. During a period of service, the prior art bolts tended to seize, as noted above. During maintenance to replace worn internal components, the bolts sometimes broke when an attempt was made to loosen the bolts. This left a broken bolt shank in the hole, which had to be drilled out. The hole had to be retapped, which increased the cost of maintenance and extended the time in which the prior art valve was out of service. Since these valves are used in large plants, refineries, and mills, an extended outage or downtime due to delays in replacing internal components in a valve is extremely expensive due to the cost in lost production. Lost production in a large unit can have an associated cost of tens of thousands of dollars per hour, so even a brief delay in getting a valve back in service can be very expensive. The present invention solves this problem.

Figure 3:
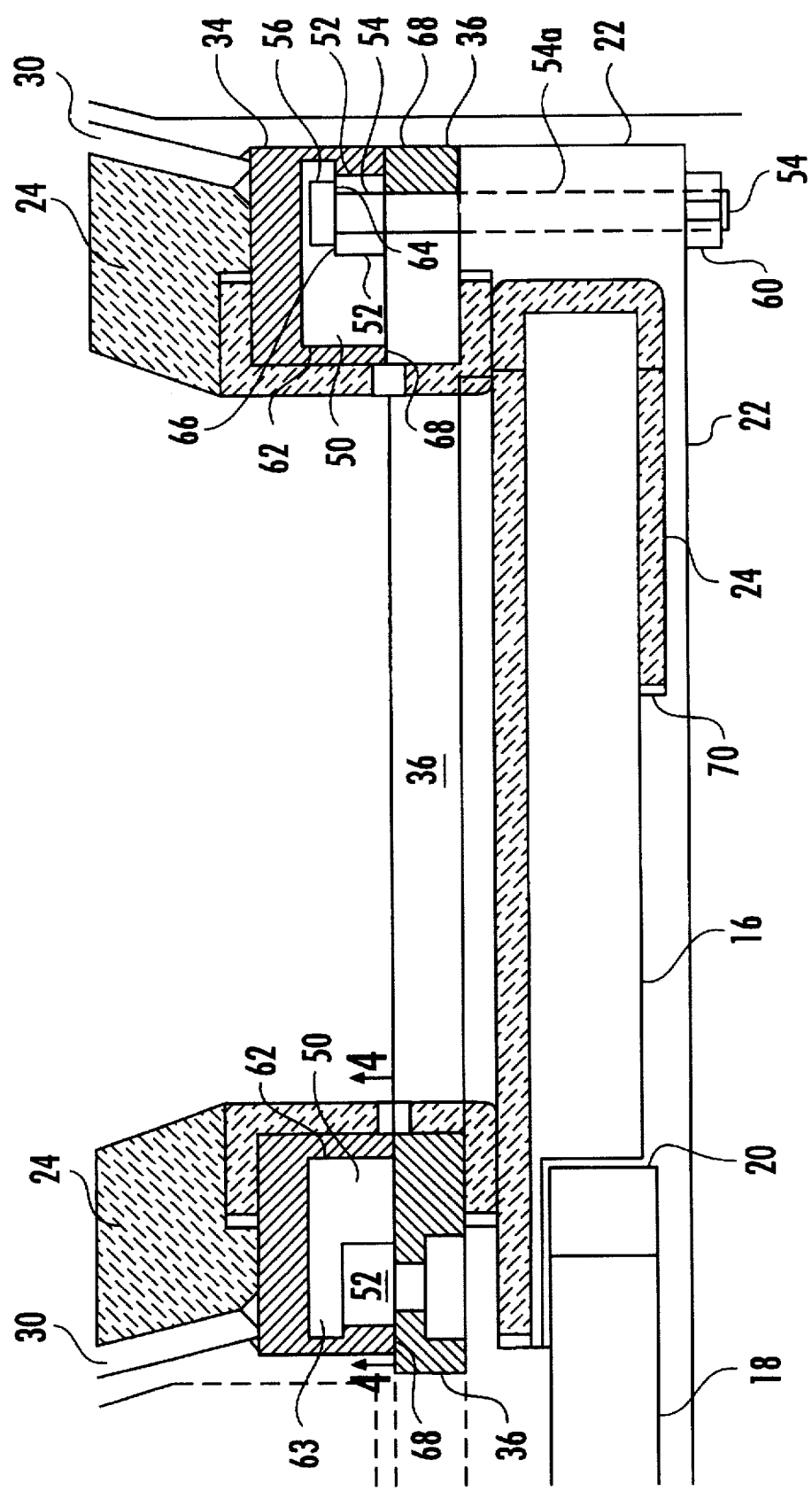
FIG. 3 is an enlarged view of a portion of the valve of FIG. 1 indicated in the area circled and designated there by reference numeral 3.
Figure 4:
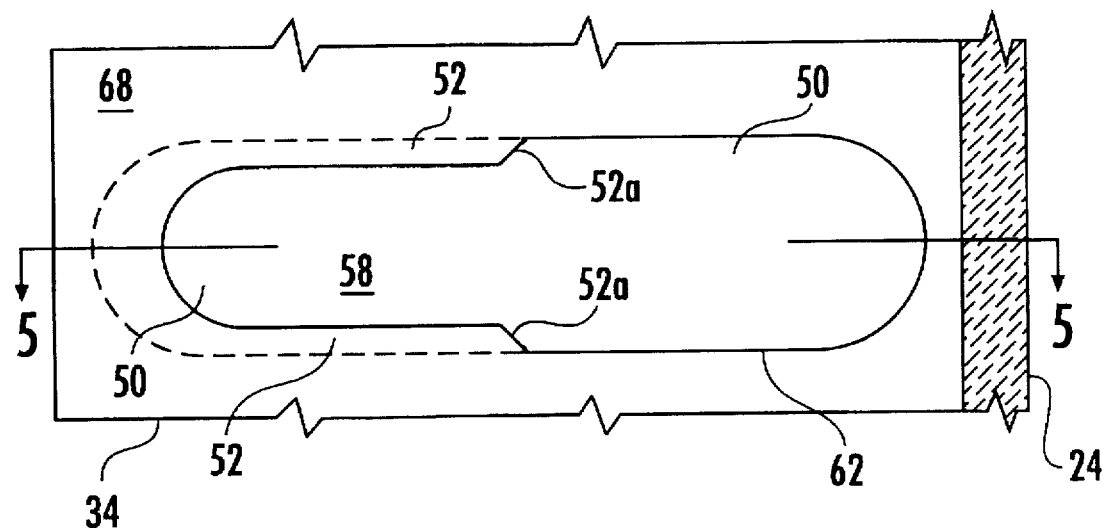
FIG. 4 is a top view of a tee slot portion of the structure of FIG. 3 as seen along the lines 4—4.
Figure 5:
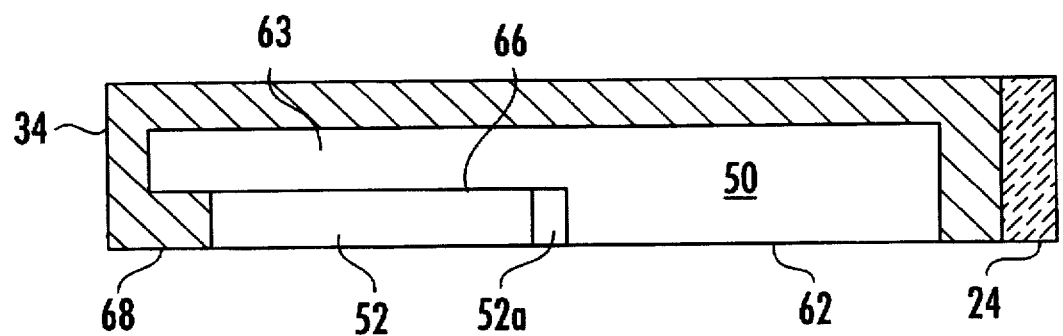
FIG. 5 is a side cross section of the tee slot of FIG. 4 as seen along the lines 5—5.

A plurality of generally elongated cavities 50 (FIGS. 3–5) are bored into the seat plate 34 to serve as tee-slots for removably receiving tee bolts for mounting the seat plate 34. Each cavity 50 has an inwardly projecting extension or shoulder 52 extending into the cavity 50 along a portion of its length (FIGS. 4 & 5). Each cavity 50 receives a tee bolt 54 for securing the orifice plate 36 to the seat plate 34. With reference to FIG. 3, the tee bolt 54 is shown in one cavity 50, while a second cavity 50 is shown without a tee bolt 54. The tee bolt 54 has a head 56, suitably shaped (rectangular, hexagon or otherwise), which is inserted into a slot or channel 58 in the cavity 50 behind the shoulder 52. The tee bolt head 56 may then be slid in slot 58 over into the position shown in FIG. 3. The head 56 engages the slotted projection 52, and a nut 60 can then be threaded onto the tee bolt 54.

A top view of a typical tee slot 62 is shown in FIG. 4 as seen along the lines 4—4 in FIG. 3. The tee slot 62 is a hole or slot 58 bored into the seat plate 34 with an enlarged width channel or slot 63 counterbored along a portion of its length from the cavity 50 behind the inwardly extending projection or cantilever extension 52. The head 56 of the bolt 54 can be square or otherwise shaped and of a size to engage inside walls 62a in the tee slot 62 so that the tee bolt 54 does not rotate while the nut 60 is tightened onto or loosened from the tee bolt 54. Ordinarily, friction between the head 56 and the projection 52 is sufficient to prevent rotation of the tee bolt 54. An installer places the bolt head 56 into the slot 58 and slides the tee bolt 54 over so that the bolt head 56 fits within the slot 63. Chamfered surfaces 52a are formed at the inlet of projection 52 for guiding the bolt head 56 into position.

The bolt head 56 has a lower surface 64, which rests on an inner surface 66 of projection 52, so that a shaft 54a of bolt 54 extends downwardly below a surface 68 of seat plate 34. The surface 66 of projection 52 is machined to extend parallel with the seat plate surface 68. The head surface 64 is formed perpendicular to the longitudinal axis of the tee bolt 54. In this manner the tee bolt 54 when in slot 63 extends perpendicular relative to the seat plate surface 68.

Figure 6:
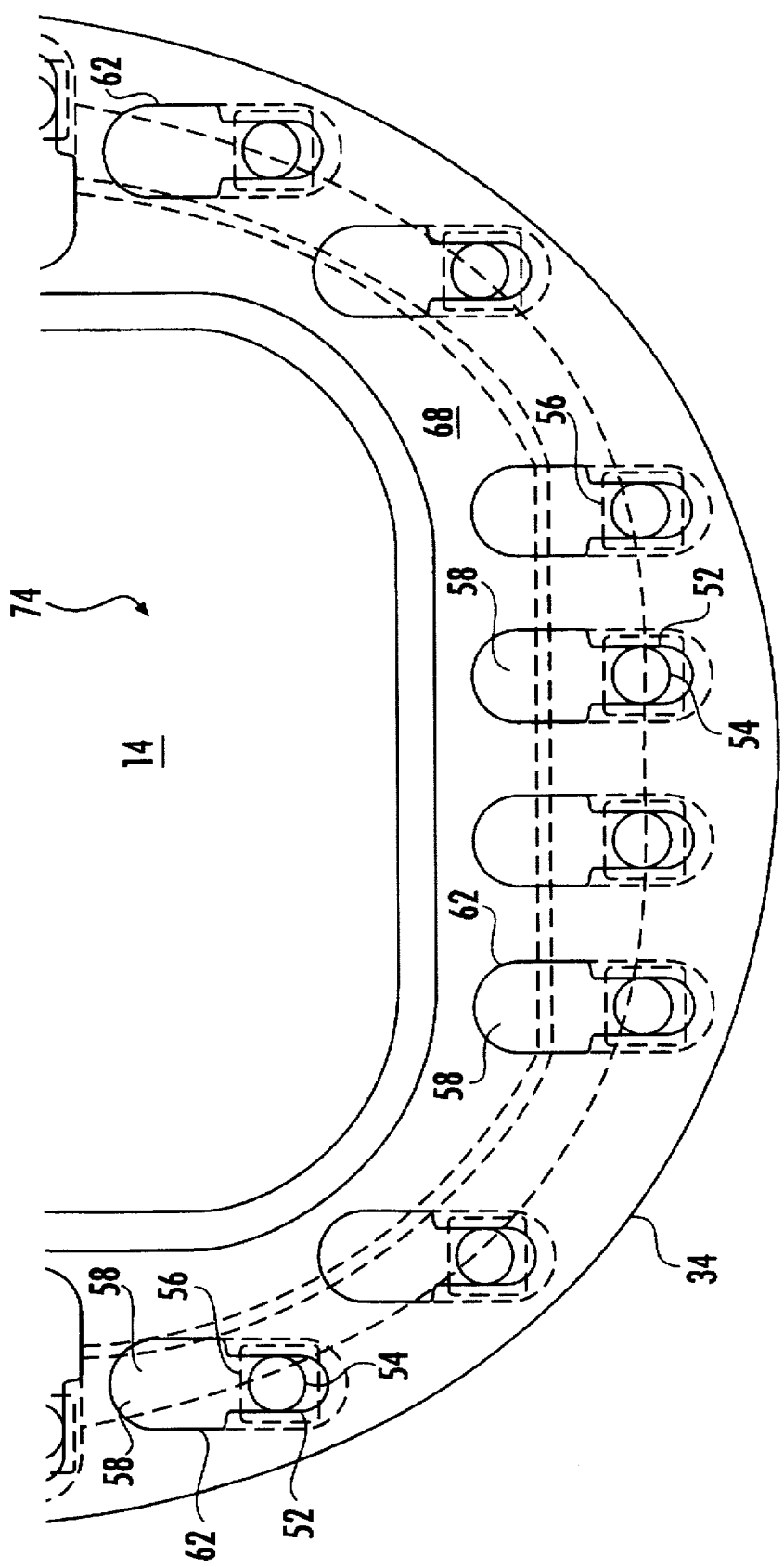
FIG. 6 is a view of a valve seat plate without an orifice plate or guides bolted thereon, as would be seen along the lines 6—6 in FIG. 1.

FIG. 6 shows one form of the seat plate 34 with the internals 37 removed, viewing the seat plate 34 along the lines 6—6 in FIG. 1. Since in FIG. 6 the internal components 37 have been removed, the disc 16, the guides 22, and the orifice plate 36 are not shown. The tee slots 62 are shown with the tee bolts 54 installed and ready to receive the orifice plate 36. Interior surfaces of the seat plate 34 are covered with refractory material 24 for heat and erosion protection. Refractory retainers 70 help to hold the refractory material 24 in place (FIG. 3).

Figure 7:
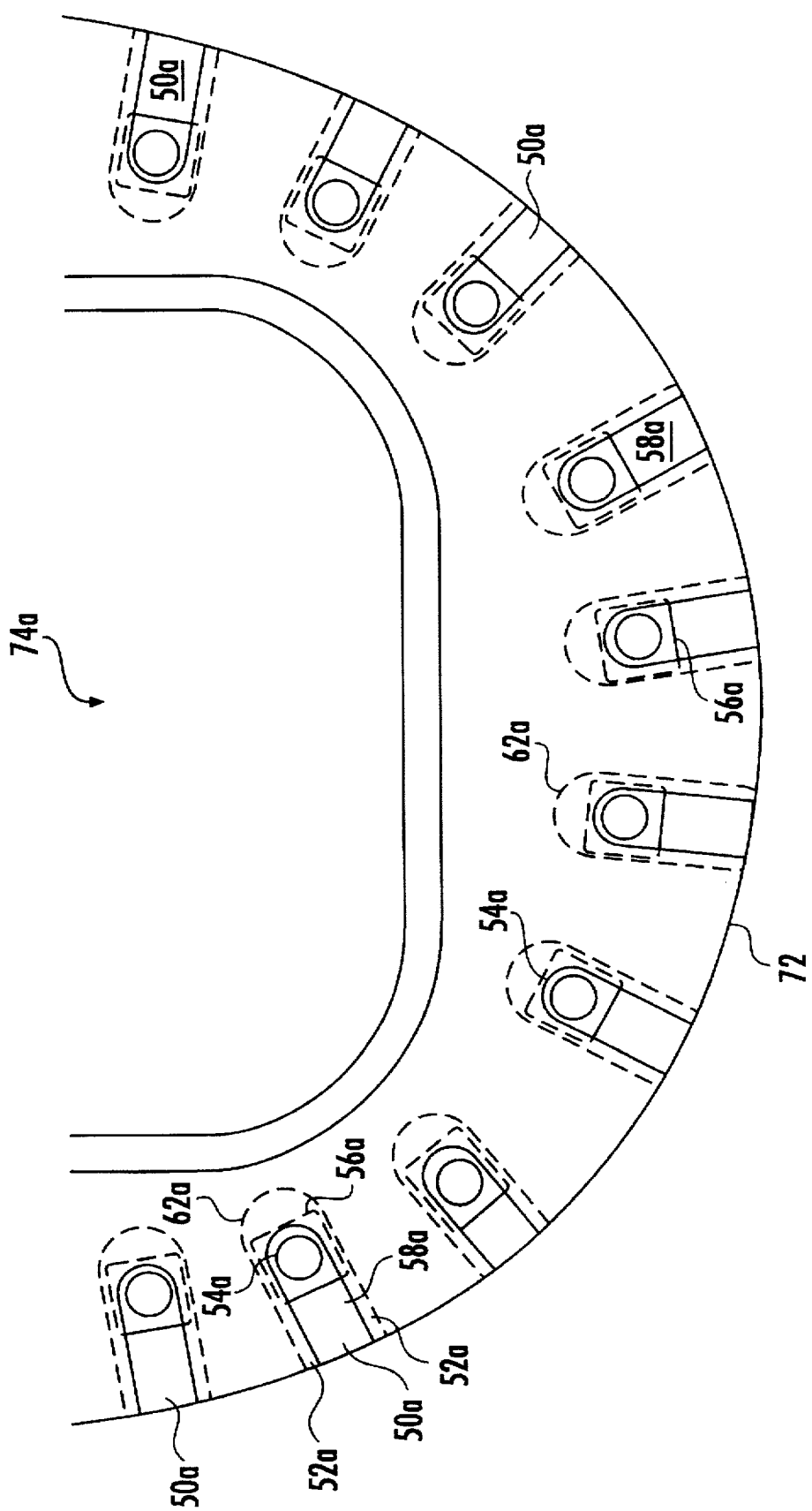
FIG. 7 provides the same view as FIG. 6, but of an alternative embodiment of a valve seat plate having tee slots in a radial arrangement.

An alternative embodiment of a seat plate 34a is shown in FIG. 7. A plurality of radially outwardly extending slots 50a are counterbored into the seat plate 34a from an edge 72 of the seat plate 34a. The slots 50a have shoulders or slotted projections 52a forming a tee slot 62a. The cavities 50a have a hole 58a for receiving a head 56a of a tee bolt 54a. The tee slots 62a are arranged in a radial pattern, each tee slot 62a having a longitudinal axis that lies on a radial line.

With reference to FIG. 6, the passageway 14 has an axial centerline 74, and an opening in the orifice plate 36 aligns with the passageway 14. The opening in the orifice plate 36 has a center point which can be aligned with the axial centerline 74 in the passageway. In prior art valves it was often difficult to align a replacement orifice plate so that bolt holes in the prior art orifice plate aligned with tapped holes in the valve seat plate. Since the tapped holes in the prior art valves were in a fixed position, alignment of the prior art orifice plate was difficult.

The present invention allows bolt holes in the orifice plate 36 to be aligned with tee bolts 54 extending from the tee slots 62. The tee bolts 54 can be moved in the tee slots 62 so as to manipulate and alter the position of the tee bolts 54 so that the tee bolts 54 align with bolt holes in the orifice plate 36 and guides 22. The bolt head 56 has slack or space in the slot 63 so that the tee bolt 54 can be moved slightly to fit within bolt holes in the orifice plate 36 and guides 22. Thus, bolt holes in a replacement orifice plate 36 can be slightly mislocated, and yet, the tee bolts 54 can accommodate the inaccuracy because the tee bolt 54 is not fixed in its position. This solves the misalignment problem experienced with prior art valves.

To make the present invention, tee slots 62 are made in the seat plate 34. In prior art valves holes were drilled and tapped for receiving bolts, but in the present invention tee slots 62 and tee bolts 54 are used instead. As shown in FIG. 3, the projection surface 66 is machined parallel with the seat plate surface 68 so that the tee bolt 54 extends perpendicular from the seat plate 34. Prior art bolts did not always extend perpendicular to the seat plate because the holes may not have been drilled perpendicular to the seat plate.

To use the present invention, the valve 10 after being installed is placed in service and used until the internal components 37 need to be replaced. The valve 10 is then taken out of service to replace the internal components 37. The actuator (not shown) is removed from the stem 18. The flange bolts 44 are removed, and the bonnet cover flange 42 is removed for access to the internal components 37. The stem 18 and the disc 16 are removed. The nuts 60 are typically welded to the tee bolt 54 and the orifice plate 36. The nuts 60 are removed, usually by cutting with a welding arc or by shearing, and the orifice plate 36 is removed along with the guides 22. The bolt head 56 can be easily slid out of the tee slot 62, and new tee bolts 54 can be quickly inserted to receive a replacement orifice plate 36. If a prior art bolt broke off, the hole would have to be redrilled and retapped at considerable expense as described above.

The present invention allows the internal components 37 to be replaced without having to redrill and retap a hole, reducing the time required to replace the internal components 37. Thus, the internal components 37 can be replaced without a lengthy downtime and its associated cost in lost production. With the present invention, the tee bolts 54 can be moved and aligned with bolt holes in the orifice plate 36, solving misalignment problems. Further, thermal expansion is accommodated by the present invention because the tee bolts 54 can slide and move within the slot 63 as the valve 10 expands or contracts due to changes in temperature.

Obviously, modifications and alterations to the embodiment disclosed herein will be apparent to those skilled in the art in view of this disclosure. However, it is intended that all such variations and modifications fall within the spirit and scope of this invention as claimed.

What is claimed is:

1. An orifice plate assembly configured for easily replaceable mounting in a passageway through a valve body of a valve, comprising:

an orifice plate in said passageway;

a seat plate in said valve body proximate to the passageway mounting said orifice plate in said passageway;

said seat plate having plural elongated cavities formed on a surface thereof engageable by said orifice plate;

said seat plate having a slot extending laterally from each of said elongated cavities defined by an outer surface of the seat plate and having shoulders formed inwardly of said slot, said shoulders defining a connector member passage channel therein;

said seat plate further having a surface contacting said orifice plate;

said connector member passage channel extending between a surface of the orifice plate and said slot;

a connecting assembly removably mounting said seat plate in said valve body, said connecting assembly comprising:

plural connector members, each mounted with a guide component at a first end and having a head portion at an opposite end;

said head portions each being insertable into one of said cavities and laterally movable past said shoulders into said slot; and said shoulders having an inner surface facing said slot and wherein said head portions rest on said inner surfaces.

2. A valve having easily removable internal components, comprising:

a valve body having a passageway for flow therethrough;

a valve member disposable within the passageway;

an orifice plate removably mounted in said passageway;

a seat plate in said valve body proximate to the passageway removably mounting said orifice plate in said passageway;

said orifice plate and said seat plate having engageable surfaces for relative lateral movement between them;

said seat plate having plural elongated cavities formed on said engageable surface thereof, said seat plate having a slot extending laterally from each of said elongated cavities defined by an outer portion of the seat plate and having shoulders formed inwardly of said slot, said shoulders defining a connector member passage channel therein;

said seat plate further having a surface contacting said orifice plate;

said connector member passage channel extending between a surface of the orifice plate and said slot;

a connecting assembly removably mounting said seat plate in said valve body, said connecting assembly comprising:

plural connector members, each mounted with a guide component at a first end and having a head portion at an opposite end extending from said engageable surface of said orifice plate;

said head portions each being insertable into one of said cavities and laterally movable past said shoulders into said slot; and said shoulders having an inner surface facing said slot, and wherein said head portions rest on said inner surfaces.

3. A valve having easily removable internal components, comprising:

a valve body having a passageway for flow therethrough;

a valve member disposable within the passageway;

an orifice plate in said passageway;

a seat plate in said valve body proximate to the passageway mounting said orifice plate in said passageway;

said seat plate having plural elongated cavities formed on a surface thereof engageable by said orifice plate;

said seat plate having a slot extending laterally from each of said elongated cavities defined by an outer portion of the seat plate and shoulders formed inwardly of said slot, said shoulders defining a connector member passage channel therein;

said seat plate further having a surface contacting said orifice plate;

said connector member passage channel extending between a surface of the orifice plate and said slot;

a connecting assembly removably mounting said seat plate in said valve body, said connecting assembly comprising:

plural connector members, each mounted with a guide component at a first end and having a head portion at an opposite end;

said head portions each being insertable into one of said cavities and laterally movable past said shoulders into said slot; and said shoulders having an inner surface facing said slot and wherein said head portions rest on said inner surfaces.

4. The valve of claim 3, wherein said shoulders have guiding surfaces formed thereon adjacent said connector member passage channel.

5. The valve of claim 4, wherein said guiding surfaces are chamfered for guiding said head portions.

6. The valve of claim 4, wherein said inner surface extends substantially parallel to said surface of the orifice plate.

7. The valve of claim 4, wherein said seat plate is movable in a parallel direction with respect to said surface of the orifice plate.

8. The valve of claim 7, wherein said connector member passage channel is formed extending in the parallel direction.

9. The valve of claim 4, wherein said connector members are bolts mounted extending through said orifice and seat plates with threaded surfaces thereon at said first end, and further including:

connector nuts releasably attached to said threaded surfaces for attaching said orifice plate to said seat plate.

* * * * *